United States Patent
Voss et al.

(10) Patent No.: US 7,328,212 B2
(45) Date of Patent: Feb. 5, 2008

(54) GENERALIZED METHOD FOR MODELING COMPLEX ORDERED CHECK CONSTRAINTS IN A RELATIONAL DATABASE SYSTEM

(75) Inventors: Douglas Voss, Nashua, NH (US); George Eadon, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 1231 days.

(21) Appl. No.: 09/871,338

(22) Filed: May 31, 2001

(65) Prior Publication Data

US 2003/0078923 A1 Apr. 24, 2003

(51) Int. Cl.
*G06F 7/00* (2006.01)

(52) U.S. Cl. .................................. 707/7; 707/7; 707/3

(58) Field of Classification Search .................. 707/3, 707/7
See application file for complete search history.

(56) References Cited

PUBLICATIONS

Oracle Corporation, Analytic Functions for Oracle 8i, Oct. 1999, Oracle Corporation.*

Jason S. Couchman, DBA Certification Exam Guide, 1998, Osborne/MaGraw-Hill.*

* cited by examiner

*Primary Examiner*—Mohammad Ali
*Assistant Examiner*—Kuen S. Lu
(74) *Attorney, Agent, or Firm*—Roger Kennedy

(57) ABSTRACT

A system for enabling a user of a relational database to define and enforce ordered check constraints to insure that defined logical relationships are maintained between data values in pairs of adjacent rows when adjacency is defined by some ordering of the data. These inter-row conditions, here called "ordered check constraints," are expressed by a logical expressions which define a required relationship between the attributes of a given row and its adjacent row or rows. Arbitrarily complex expressions involving these sets of attributes can be formed to model the constraints of interest. These expressions can be created by the database in support of, for example, traditional primary key or uniqueness constraints, or they can be provided by the database user to model new more complex constraints such as a requirement that there be no gaps in a list of serial numbers. These constraints can then be efficiently supported in the presence of a b-tree or another ordered index structure by identifying any inserted, updated or deleted rows and evaluating the expression in the context of those rows and any associated adjacent rows. This approach is similar to that typically used in existing database systems to support primary key and uniqueness constraints, providing the user with the ability to model a much richer set of constraints using a generalized expression which extends and enhances the functionality of check constraints to permit relationships of data in different rows to be defined and enforced.

16 Claims, 5 Drawing Sheets

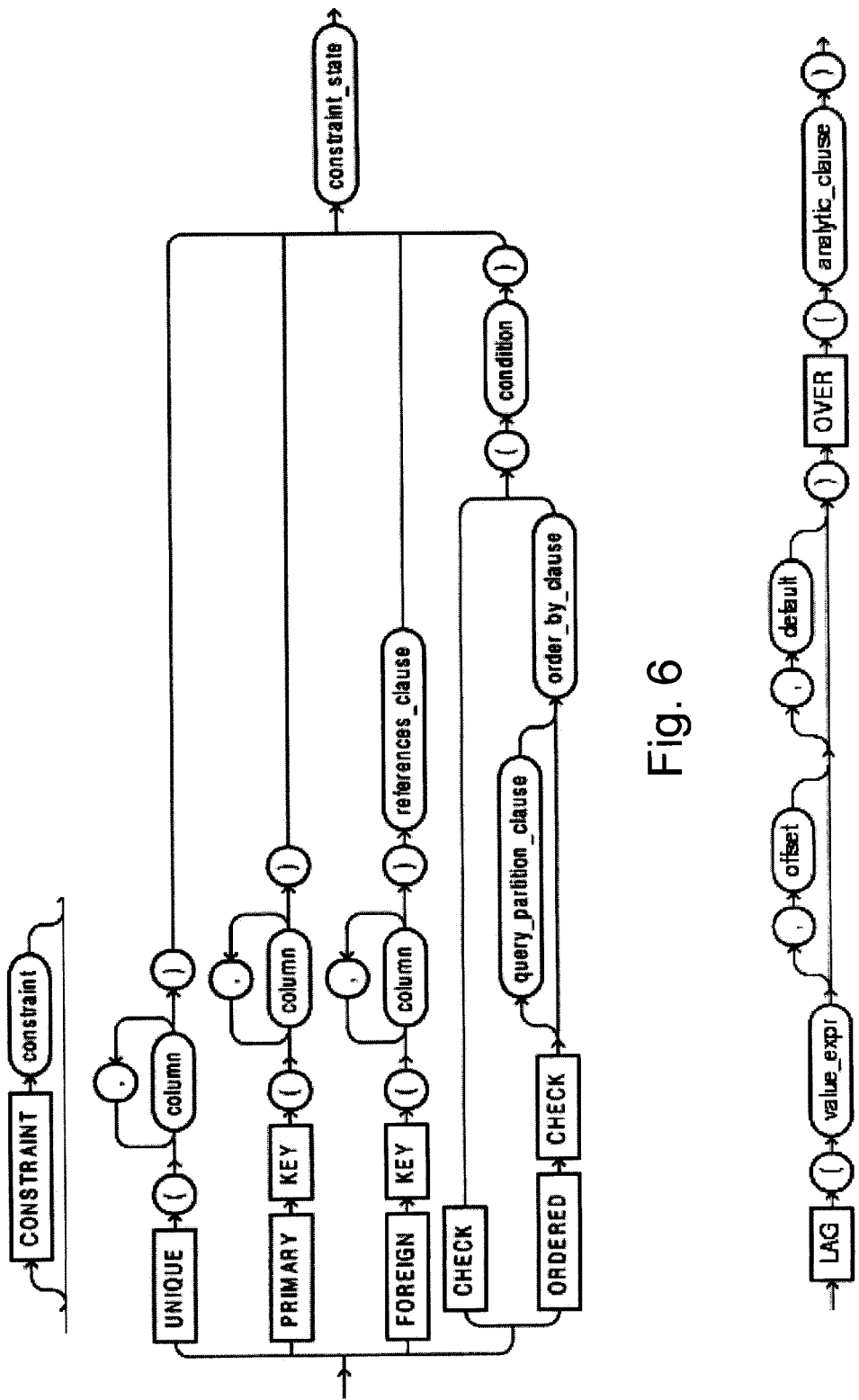

GENERALIZED METHOD FOR MODELING COMPLEX ORDERED CHECK CONSTRAINTS IN A RELATIONAL DATABASE SYSTEM

FIELD OF THE INVENTION

This invention relates to data storage systems and more particularly to relational database management systems.

BACKGROUND OF THE INVENTION

Constraints are commonly used in database system to define the conditions under which selected data items are valid. The database management system typically provides one or more mechanisms that permit constraints to be easily associated with specific items of data. Thereafter, the system automatically performs tests to verify that the new or modified data satisfies the specified constraint conditions. In this way, constraints help to insure the integrity and quality of the data stored in the database.

A first class of constraints are often used to support indexing, sorting and referencing. A "not null" constraint may be employed to guarantee the presence of data in a given column, and a "unique" constraint may be associated with table's primary key to prevent the creation of rows with duplicate keys. A "referential integrity" constraint may be associated with a column which holds a "foreign key" to enforce the rule that the value placed in that column must correspond to a primary key value found in another table. These constraints may be imposed automatically by the database management system for columns specified as a table's primary, secondary or foreign keys.

Relational database management systems also typically permit the user to create "check" constraints. Check constraints enhance data integrity by forcing the data to comply with user-specified conditions without requiring procedural logic such as in stored procedures and triggers. A check constraint places data value restrictions on the contents of a column as expressed in a Boolean expression created by the user. Any attempt to modify the column data (i.e. during INSERT and UPDATE processing) will cause the conditions expressed in the check constraint to be evaluated. If the modification conforms to the Boolean expression, the modification is permitted to continue. If not, the attempted modification will fail with a constraint violation.

Check constraints are typically written using a recognizable SQL syntax that defines the constraint conditions. The example below illustrates the manner in which constraints are specified in an illustrative SQL "create table" statement:

```
create table WORKER (
Name       CHAR (25) PRIMARY KEY,
Location   CHAR (25),
Age        NUMBER CHECK (Age BETWEEN 18 AND 65),
Lodging    VARCHAR2 (15) REFERENCES LODGING (Lodging),
Salary     DECIMAL (7,2) NOT NULL,
constraint CHECK_SALARY CHECK (SALARY < 50000.00),
Commission DECIMAL (7,2)
);
```

In the foregoing statement, the Name column is identified as the primary key for the table and is therefor automatically constrained to hold a unique, non-null value. No constraints are specified for the Location column. The Age column is subject to a check constraint that ensures that the Age column will contain only values that range from 18 to 65. The Lodging column is expressed as a foreign key reference and is thus automatically subject to a referential integrity constraint which ensures that the value placed in the Lodging column must correspond to an actual value in the primary key column of another table (the Lodging column of the LODGING table). The Salary column is subject to the constraint that it must not contain a null value. The salary column value must also satisfy the condition expressed in the check constraint named CHECK_SALARY which specifies that the value in the Salary column must be less than 50000.

The constraints discussed above are column-level constraints. Check constraints may also be defined at the table-level after all of the columns of the table are been defined. It is quite common for business rules to require that a specified relationship exist between different columns within a single table. When this situation occurs, the business rule may be expressed as a check constraint at the table-level instead of at the column level. Table level constraints can be used to define required relationships between the values placed in different columns as illustrated by the following SQL example (which could be inserted at the end of the example create table statement listed above) above:

,constraint COMM_BONUS CHECK (Salary>0 OR Commission>0)

This table level constraint is named COMM_BONUS and requires that, within a given row, the value in either the Salary or Commission column must be greater than zero.

Check constraints may be used to enforce business rules directly in each database without requiring additional application logic. Once defined, the business rule is physically implemented and can not be bypassed. Check constraints provide improved productivity for at least the following reasons: (1) no additional programming is required, allowing database administrators to implement business rules as check constraints without involving the application programming staff; (2) check constraints provide better data integrity since validation is always executed whenever the data in the associated column(s) is inserted or updated, and the business rule cannot be bypassed during ad hoc processing and dynamic SQL operations; (3) check constraints promote consistency because they are implemented once and always enforced, whereas rules incorporated into application logic must be executed by each program that modifies the data to which the constraint applies, resulting in duplicative code that is difficult to maintain; and (4) check constraints implemented directly within the database system will typically outperform the corresponding application code.

There is, however, an important class of business rules which cannot be expressed and enforced using the conventional column and table check constraint mechanisms that are typically available to database users. The members of this class of constraints can be defined by a specified relationship between pairs of adjacent rows when adjacency is defined by a specified ordering of the data. Existing technology would require the use of triggers to model such complex constraints. Triggers are stored procedures which are executed upon a certain event, such as a table update, insert or delete operation. However, triggers capable of testing relationships between data in different rows are difficult to write for those without special programming skills, and result in much less efficient processing.

BRIEF SUMMARY OF THE INVENTION

It is an object of the present invention to more easily specify and more efficiently enforce conditions that are defined by a relationship between different rows in a database table.

As contemplated by the invention, conditions are enforced between pairs of adjacent rows when adjacency is defined by some ordering of the data. These inter-row conditions, here called "ordered check constraints," are expressed by a logical expressions which define a required relationship between the attributes of a given row and its predecessor. Arbitrarily complex expressions involving these sets of attributes can be formed to model the constraints of interest. These expressions can be created by the database in support of, for example, traditional primary key or uniqueness constraints, or they can be provided by the database user to model new more complex constraints such as a requirement that there be no gaps in a list of serial numbers. These constraints can then be efficiently supported in the presence of a b-tree or another ordered index structure by identifying any inserted, updated or deleted rows and evaluating the expression in the context of those rows and any associated adjacent rows.

This approach is similar to that typically used in existing database systems to support primary key and uniqueness constraints. The present invention provides the user with the ability to model a much richer set of constraints using a generalized expression which extends and enhances the functionality of check constraints to permit relationships of data in different rows to be defined and enforced.

These and other objects, features and advantages of the present invention may be more clearly understood by considering the following detailed description of a specific embodiment of the invention. In the course of this description, frequent reference will be made to the attached drawing.

BRIEF DESCRIPTION OF THE SEVERAL VIEWS OF THE DRAWING

FIG. 6 shows the syntax for the table_or_view_constraint clause.

FIG. 7 is a syntax diagram for the lag function.

DETAILED DESCRIPTION OF THE INVENTION

Relational database management systems, such as the Oracle 8i and Oracle 9i family of products available from Oracle Corporation of Redwood Shores, California, typically provide various mechanisms for defining and enforcing constraints. In many such systems, user-specified check constraints may be defined when tables are created using SQL statements. These constraints are specified using SQL syntax. See, for example, Chapter 17: Creating, Dropping and Altering Tables and Views, *ORACLE* 8, *The Complete Reference*, Osborne/McGraw Hill 1997, ISBN 0-07-882396-X.

As contemplated by the present invention, the mechanism for handling check constraints may be expanded to permit ordered check constraints to be defined and enforced. In accordance with the invention, an ordered check constraint specifies a logical relationship that must exist between data values that occupy one or more column positions in a given row of a table and the data values that occupy defined column positions in an adjacent row of that table where adjacency is defined by a specified ordering of the rows in the table.

Constraint Processing

Figure 1:
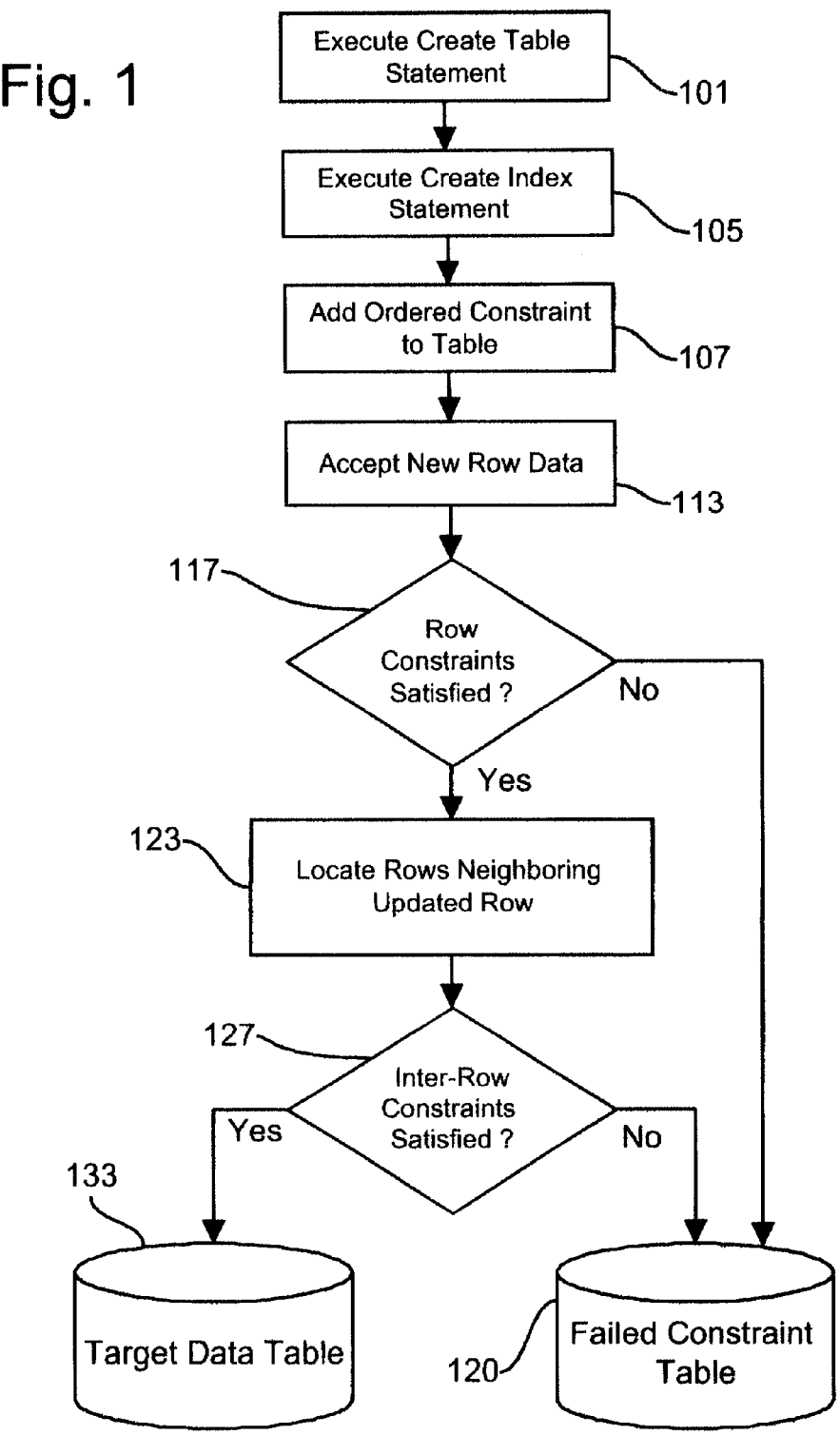
FIG. 1 is a flow chart illustrating the steps performed by a database system during the creation and enforcement of an ordered check constraint which implements the invention.
Figure 2:
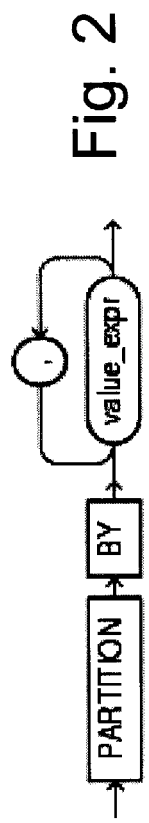
FIG. 2 shows the syntax for the query_partition_clause of an ordered constraint statement expressed in Structured Query Language (SQL).
Figure 3:
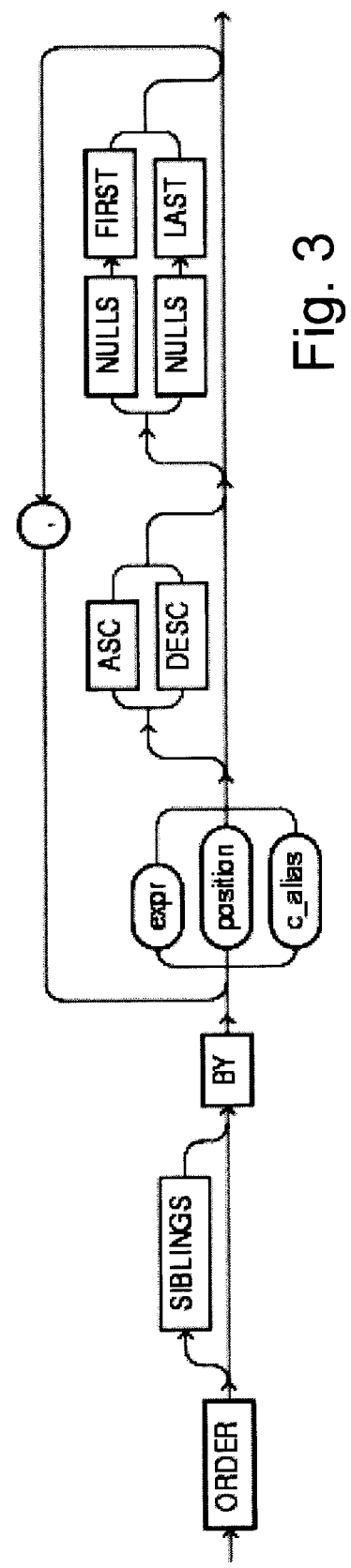
FIG. 3 is a syntax diagram for the order_by_clause referenced in FIG. 6.
Figure 4:
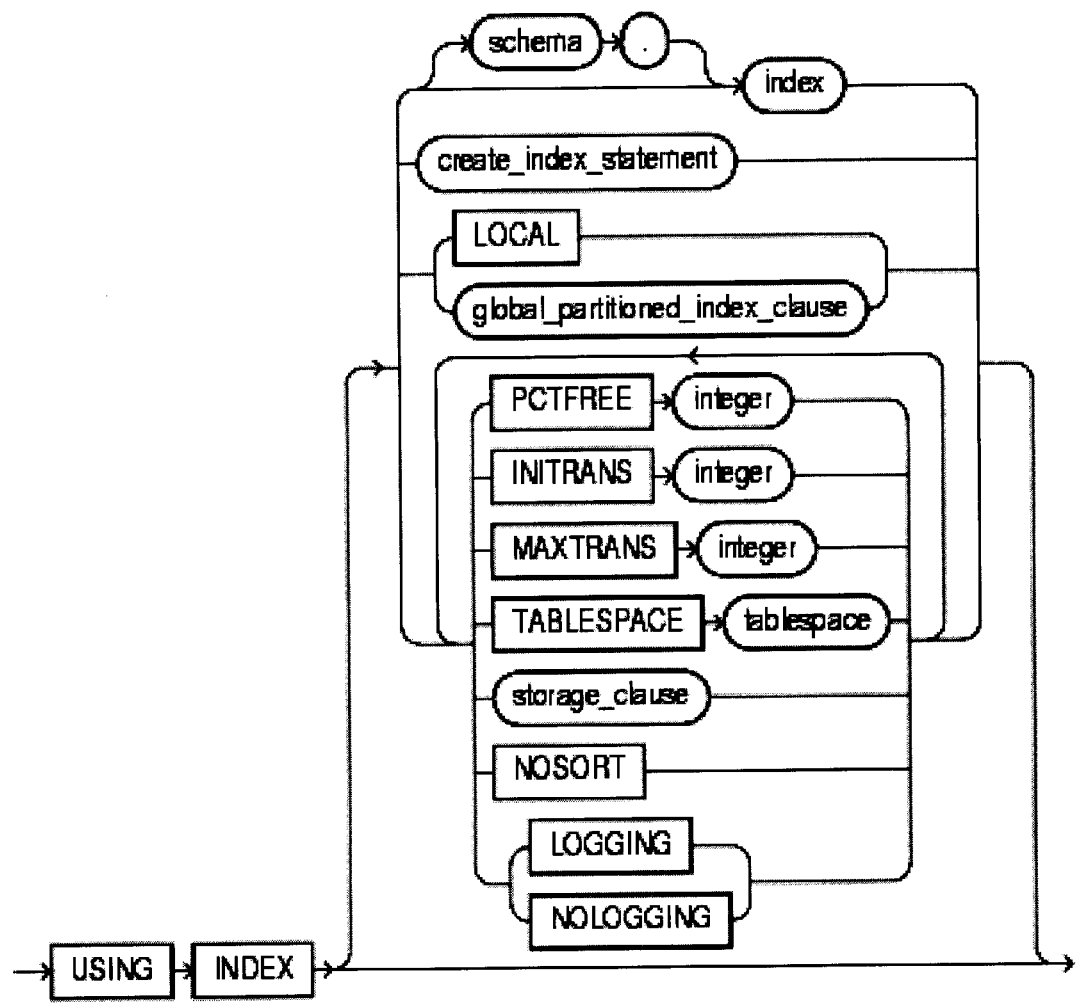
FIG. 4 shows the syntax for the using_index_clause referenced in FIG. 5.

As illustrated by the example depicted in flow chart form by FIG. 1, the database system implements ordered check constraints by performing a sequence of processing steps. First, a create table SQL statement is performed at 101 to create a table. Next, a create index statement is executed at 105 to build an index on the table created at 101 to establish a predetermined order for the rows of that table. Next, as seen at 107, an alter table SQL statement is executed at 107 to and an ordered constraint to the table, specifying the order to be used in applying the ordered constraint.

When new row data is accepted by the executing an insert or update operation as shown at 113, tests are first performed at 117 on the new row data to determine if all column and table constraints (which relate to data values within the new row) are satisfied. If an intra-row constraint is not satisfied, the attempted insertion or update operation is rejected as indicated at 120.

If the new or modified row satisfies the conventional intra-row constraints, the database system then uses the index file (created at 105 to improve the performance of the ordered constraint) to identify the rows which will be adjacent to the new or modified row when that row is placed in the order specified for the ordered constraint. If the new or modified row would be the first row in the table in the designated order there will be no preceding row and, to that extent, the first row will be deemed to satisfy the ordered check constraint. Similarly, if the new or modified row would be the last row in the table in the designated order, there will be no following row and, to that extent, the new or modified row will be deemed to satisfy the ordered check constraint.

In the case when the new or modified row has both a preceding adjacent row and an following adjacent row, two tests are made. The first test determines whether the new or modified row and its preceding row satisfy the condition expressed in the ordered check constraint. If it does, a second test is performed to determine if whether the new or modified row and the following row satisfy the condition (note that the new or modified row has become a new preceding row for the following row, requiring that the following row be tested again for compliance with the condition expressed by the condition). If both tests are satisfied, the new or modified row data are placed in the target table 133; otherwise, if either test fails, the attempted insertion or update operation is rejected as indicated at 120.

Note that an attempt to delete a row also triggers a test to insure that rows which precede and follow the deleted row will satisfy the condition imposed by the ordered check constraints after the deletion is made. If this test fails, the attempted deletion is rejected.

Example SQL statements for creating a table subject to an ordered check constraint are set forth below:

```
create table SLOTS (
    Occupant   CHAR (25) primary key,
    sequence   number NOT NULL,
    Entry_date date NOT NULL
);
```

```
create index INSEQUENCE on SLOTS (sequence);
alter table SLOTS add constraint NO_GAP order by sequence
    check (sequence = LAG (sequence, 1) + 1);
```

The table name SLOTS is first created in the normal way without the constraint, the index named INSEQUENCE is then created to provide an index on the SLOTS table by the sequence, and then the user-defined ordered check constraint named NO_GAP is added to the SLOTS table by the alter table statement. The NO_GAP constraint may, for example, require that the data value in the sequence column must always be one greater than the data value in the sequence column of the prior row where "prior" is defined in the "order by" clause to be the sequence column.

For efficiency, the ordered check constraint should be supported by either an existing index established by the primary key designation for the table or by an index created specially to support the ordered check constraint (and/or for some other purpose) as noted in the example above. The "order by" clause specifies an sequencing order for the rows of the table that allows the row preceding and following any given row to be identified and thus permits the logical condition expressed by the ordered check constraint to be evaluated, and the existence of the designated index permits that evaluation to be efficiently performed.

Syntax for Defining Ordered check Constraints

The syntax used for defining ordered check constraints is preferably an extension of the existing SQL syntax used to define conventional constraints, and may take the form defined by the syntax diagrams shown in FIGS. 2–7. These syntax diagrams show the manner in which ordered constraints are defined within the context of the existing SQL syntax used in the Oracle family of databases. Detailed information on the Oracle SQL language and its syntax can be found in the *Oracle 8i SQL Reference* available from Oracle Corporation. This reference contains a complete description of the Structured Query Language (SQL) used to manage information in an Oracle database. Oracle SQL is a superset of the American National Standards Institute (ANSI) and the International Standards Organization (ISO) SQL92 standard at entry level conformance. Appendix A to the Oracle 8i SQL Reference describes the syntax diagram notation, which is in common use for to visually defining program language syntax. See, for example, *Pascal User Manual and Report* 2ed by Jensen, K. and Wirth, N. (1974). Springer-Verlag.

Figure 5:
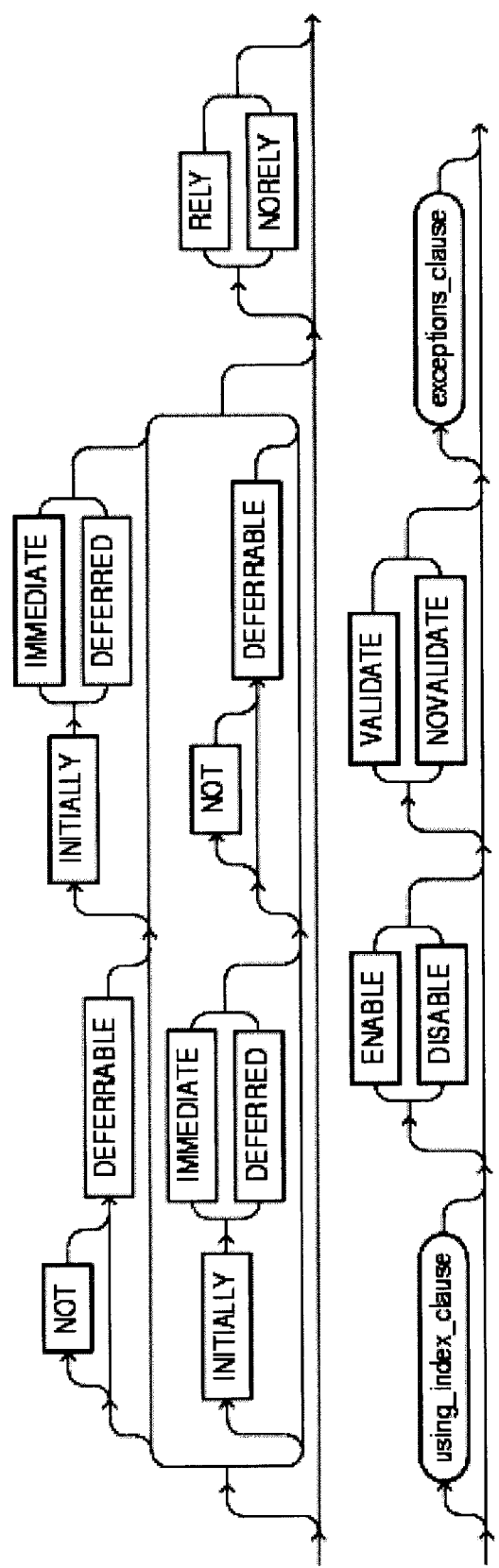
FIG. 5 is a syntax diagram for the constraint_state clause referenced in FIG. 6.

The syntax of the clauses shown in FIGS. 2–8 is substantially unchanged from that previously used in Oracle SQL. The query_partition_clause shown in FIG. 2, the order_by_clause shown in FIG. 3, the using_index_clause shown in FIG. 4, and the constraint_state clause shown in FIG. 5 are existing syntactic elements in Oracle SQL, and the only change is seen in the table_or_view_constraint syntax diagramed in FIG. 6, which adds the new of the "ORDERED CHECK" branch seen at the bottom of the diagram.

The condition part of the ORDERED CHECK branch of shown in FIG. 6 may include a LAG function which takes the form of a subset of the standard LAG analytic function which has the syntax shown in FIG. 7. The condition for an ordered check constraint is subject to all of the restrictions placed on traditional check conditions (i.e., it cannot reference columns of other tables, cannot reference SYSDATE, etc.) with one exception: the condition may use "LAG (<expr>)" and "LAG(<expr>, 1)" to compute expressions over the column values from the row which immediately precedes the current row according to the logical partitioning and ordering specified in the constraint declaration. For consistency with the LAG analytic function syntax shown in FIG. 7, "LAG(<expr>, 0)" is allowed as a alternative way to compute an expression over column values from the current row. In addition, expressions of the form "LAG(<expr>, <lag-by-expr>)" may also be allowed so that a condition could dynamically switch between references to the current and previous row. In this case an exception would be raised if <lag-by-expr> did not evaluate to 0 or 1.

When used as an analytic function as depicted in FIG. 7, LAG accepts a third parameter which is used as a default when at attempt is made to LAG past the beginning of the data. This feature of the LAG analytic function need not be supported when the LAG function is used in the condition part of an ordered constraint.

Formal Definition

The ordered check constraint may be formally defined as follows Consider the general ordered check constraint, where C(.) is a logical expression:

```
ORDERED CHECK PARTITION
    BY pb0, pb1, . . . pbNpb
    ORDER BY ob0, ob1, . . . obNob
    ( C(c0, c1, . . . cM, LAG (c0), LAG (c1), . . . LAG (cM) )
```

This constraint is satisfied if and only if the following query returns zero rows:

```
SELECT NULL FROM (
    SELECT c0, c1, . . . cM,
        LAG (c0) OVER (PARTITION BY pb0 . . . pbNpb
            ORDER BY ob0 . . . obNob) AS lag_c0,
        LAG (c1) OVER (PARTITION BY pb0 . . . pbNpb
            ORDER BY ob0 . . . obNob) AS lag_c1,
        . . .
        LAG (cM) OVER (PARTITION BY pb0 . . . pbNpb
            ORDER BY ob0 . . . obNob) AS lag_cM,
        COUNT(*) OVER (PARTITION BY pb0 . . . pbNpb
            ORDER BY ob0 . . . obNob
            ROWS 1 PRECEDING) AS count
    FROM tab
    WHERE NOT (pb0 IS NULL AND pb1 IS NULL AND . . .
        pbNpb IS NULL AND ob0 IS NULL AND
        ob1 IS NULL AND . . . obNob IS NULL) )
WHERE count = 2
    AND NOT(C(c0, c1, . . . cM, lag_c0, lag_c1, . . .,
        lag_cM))
```

For a detailed description of the analytic functions used in the foregoing query, see *Oracle 8i SQL Reference* noted above, or *Oracle 8i Data Warehousing* by Michael J. Corey, Michael Abbey, Ian Abramson and Ben Taub; ISBN: 0_07_882511_3.

The foregoing definition illustrates three important points:

1. Ordered check constraints, like traditional check constraints, require their condition to evaluate to either TRUE or unknown (due to a NULL).

2. Ordered check constraints ignore any rows where the partitioning and ordering columns are all NULL. Foreign key and unique key constraints also ignore all-null rows. The "NOT (ob0 IS NULL . . ." predicate in the inner query block causes this behavior.

3. Ordered check constraints do not check the first row in a partition against a set of NULL LAG values. The "count= 2" predicate in the outer query block causes this behavior.

Restrictions

To ensure that ordered check constraints are well defined, the following restrictions are preferably imposed:

If the condition refers to columns outside of the partitioning/ordering lists then some (not necessarily strict) subset of the partitioning/ordering columns must uniquely order the rows of the table. To enforce this, some subset of the partition/ordering columns must be used as a primary key, or an unique key must be used where at least one key column is NOT NULL.

To ensure that an ordered check constraint can be enforced efficiently, we have the following restriction:

The number of partition-by-columns plus the number of order-by-columns must be less than or equal to the maximum number of columns in an index. This ensures that an index can be created on all of the partition by/order by columns.

Indexes and Enabled Ordered Check Constraints

An enabled ordered check constraint requires an index on

<P(partition-columns), order-columns, . . . >

[where P(.) is an arbitrary permutation]. If this index is partitioned, then it must be partitioned by a (not necessarily strict) subset of the constraint's partitioning columns.

When enabling an ordered check constraint, or creating a new ordered check constraint in the enabled state, there are four cases:

1. There is no using_index_clause—Example: "alter table foo modify constraint foo_ordered_check enable;" The system will search for an appropriate index and raise an exception if one is not found.

2. There is an using_index_clause which names an index; for example: "alter table foo modify constraint foo_ordered_check using index foo_idx enable;" If the named index exists and is appropriate then it is used to enable the constraint; otherwise an exception is raised.

3. There is an using_index_clause with a create_index_statement—Example: "alter table foo modify constraint foo_ordered_check using index (create index foo_idx on foo(c0, c1, c2)) enable;" If the given create_index_statement creates an appropriate index then the index is created and used to enable the constraint; otherwise an exception is raised.

4. All other variants of the using_index_clause are disallowed when enabling ordered check constraints. (These other variants let you specify physical parameters for indexes which are implicitly created for unique and primary key constraints.)

The following two examples illustrate the manner in which ordered constraints are defined and used employing the syntax described above.

FIRST EXAMPLE

Suppose a table has been created in a human resources database with empno, hire_date and salary columns where empno is a primary key. To constrain that salary is a decreasing function of hire date (or, equivalently, that salary is an increasing function of seniority), the following ordered constraint clause may be written:

ORDERED CHECK ORDER BY hire_date, empno (LAG(salary)>salary)

To illustrate how this constraint behaves, consider the following instantiation of this table, which is sorted on<hire_date, empno>:

| hire date | empno | salary |
|---|---|---|
| Feb. 02, 1992 | 12 | 12800 |
| Apr. 04, 1994 | 34 | 6400 |
| Apr. 04, 1994 | 56 | 1600 |

The relationship between three row pairs is constrained:

1. empno #12 is the LAG row and empno #34 is the current row—12800>6400, OK.
2. empno #34 is the LAG row and empno #56 is the current row—6400>3200, OK.
3. empno #56 is the LAG row and empno #78 is the current row—3200>1600, OK.

The following ordered check constraint is not valid because the condition refers to columns outside of the "partition by/order by" lists and the partition by/order by lists do not contain a primary key:

ORDERED CHECK ORDER BY hire_date (LAG(salary)>salary)—WRONG!

To see why this is disallowed, consider employees #34 and #56 in the preceding table. These employees share the same hire_date, so this constraint does not declare an ordering between these employees. The constraint holds if employee #34 is considered to precede employee #56, but does not hold if the alternative ordering is considered.

SECOND EXAMPLE

Suppose a tax schedule table is created with with four columns: filing_status, AGI_lower_bound, AGI_upper_bound and marginal_rate where <filing_status, AGI_lower_bound> is a primary key. Furthermore, suppose the table values are to be constrained so that no two rows for the same filing status have overlapping AGI ranges and that for every filing status there are no gaps in the AGI ranges that are covered. As an ordered check constraint, this is written:

ORDERED CHECK PARTITION BY filing_status ORDER BY AGI_lower_bound (LAG(AGI_upper_bound)=AGI_lower_bound)

Consider the following instantiation of this table that is logically partitioned by filing_status (the horizontal lines indicate partition boundaries) and that is ordered within each partition on AGI_lower_bound:

| rowid | filingstatus | AGI lower bound | AGI upper bound | marginal rate |
|---|---|---|---|---|
| 1 | single | 0 | 15000 | 0.15 |
| 2 | single | 15000 | 80000 | 0.28 |
| 3 | single | 80000 | 250000 | 0.31 |
| 4 | married | 0 | 20000 | 0.15 |
| 5 | married | 20000 | 100000 | 0.28 |
| 6 | married | 100000 | 250000 | 0.31 |
| 7 | head-of-house | 0 | 250000 | 0.32 |

In this case there are 4 row-pair relationships that are constrained. Rows #1 and #2, rows #2 and #3, rows #4 and #5 and rows #5 and #6. The only row in the 'head-of-house' partition, row #7, is not constrained in any way. Finally, notice that the "no-overlaps" constraint could be enforced without enforcing the "no-gaps" constraint using:

ORDERED CHECK PARTITION BY filing_status ORDER BY AGI_lower_bound (LAG(AGI_upper_bound)<=AGI_lower_bound)

And that "no-gaps" could be enforced without enforcing "no-overlap" using:

ORDERED CHECK PARTITION BY filing_status ORDER BY AGI_lower_bound (LAG(AGI_upper_bound)>=AGI_lower_bound)

Conclusion

It is to be understood that the preferred embodiment of the invention that has been described above is merely one illustrative implementation of the principles of the invention. Numerous modifications may be made to the methods and apparatus that have been described without departing from the true spirit and scope of the invention.

What is claimed is:

1. In a relational database system for storing data in multiple rows of a relational database table, each of said rows consisting of one or more columns, apparatus for defining and enforcing one or more ordered check constraints for said table, said apparatus comprising, in combination, means for accepting the definition of an ordered check constraint from a user, said definition consisting of the specification of a sort order in which said rows may be sequenced and the specification of a logical relationship between data values stored in at least one column in a given row of said table and data value stored in at least one column of the row which is adjacent to said given row when said given row and said row adjacent to said given row are sequenced in said sort order, processing means for evaluating the data values in adjacent pairs of rows of said table to determine whether the data values in said adjacent rows satisfy said logical relationship, and means for generating a failed constraint indication whenever said processing means determines that a pair of adjacent rows in said table do not satisfy said logical relationship.

2. The apparatus set forth in claim 1 further including an index data structure for rapidly accessing said rows of said table in said sort order.

3. The apparatus set forth in claim 2 wherein said processing means for evaluating the data values in adjacent pairs of rows in said table employs said index data structure to identify said adjacent pairs of rows.

4. The apparatus set forth in claim 1 wherein said definition is a constraint definition expressed in Structured Query Language.

5. The apparatus set forth in claim 4 wherein said constraint definition expressed in Structured Query Language includes said specification of said sort order and said specification of a logical relationship.

6. The apparatus set forth in claim 5 wherein said specification of said logical relationship takes the form of a Structured Query Language expression that refers to said data values stored in at least one column in said given row of said table and to said data value stored in at least one column of the row which is adjacent to said given row in said sort order.

7. In a relational database system for storing data in multiple rows of a relational database table, each of said rows consisting of one or more columns, the method for defining and enforcing one or more ordered check constraints for said table, said method comprising, in combination, the steps of accepting the definition of an ordered check constraint from a user, said definition consisting of the specification of a sort order in which said rows may be sequenced and the specification of a logical relationship between data values stored in at least one column in a given row of said table and data value stored in at least one column of the row which is adjacent to said given row in said sort order, evaluating the data values in adjacent pairs of rows of said table to determine whether the data values in said adjacent rows satisfy said logical relationship, and generating a failed constraint indication whenever a pair of adjacent rows in said table do not satisfy said logical relationship.

8. The method set forth in claim 7 further including the step, performed prior to said step of evaluating said data valued, of creating an index data structure for rapidly accessing said rows of said table in said sort order.

9. The method set forth in claim 8 wherein said step of evaluating said data values in adjacent pairs of rows in said table employs said index data structure to identify said adjacent pairs of rows.

10. The method set forth in claim 7 wherein said definition is a constraint definition expressed in Structured Query Language.

11. The method set forth in claim 10 wherein said constraint definition expressed in Structured Query Language includes an ordered check clause specifying said sort order and said logical relationship.

12. The method set forth in claim 7 wherein said logical relation ship takes the form of a condition expressed in Structured Query Language that refers to said data values stored in at least one column in said given row of said table and said data value stored in at least one column of the row which is adjacent to said given row in said sort order.

13. The method of defining and enforcing adherence to a specified logical relationship between the data content in different rows of a relational database table which comprises, in combination, the steps of:

specifying a predetermined ordering sequence for the rows of said table, specifying a condition which defines a logical relationship that must exist between the data content of adjacent rows in said table when said rows are ordered in accordance with said predetermined ordering sequence, accepting changes to the data in said table in the form of one or more additions or modifications to the data contained in a given row of said table, in response to the acceptance of said changes, comparing the data content in one or more pairs of adjacent rows of said table which include said given row, generating a fault indication whenever said step of comparing determines that said condition is not satisfied by the data content in one of said pairs of rows.

14. The method of claim 13 further comprising the step of generating an index data structure for rapidly accessing said data content of said one or more pairs of adjacent rows.

15. The method of claim 13 wherein said step of specifying a predetermined sort order is performed by accepting an ordering specification expressed in Structured Query Language from a database user.

16. The method of claim 15 wherein said step of specifying said condition is performed by accepting an expression defining said logical relationship expressed in Structured Query Language from a database user.

* * * * *